United States Patent Office 2,719,166
Patented Sept. 27, 1955

2,719,166
HYDROLYSIS PROCESS

Nat C. Robertson, Cambridge, Mass., and James W. Walker, Corpus Christi, Tex., assignors to Celanese Corporation of America, New York, N. Y., a corporation of Delaware No Drawing. Application December 3, 1951, Serial No. 259,713

4 Claims. (Cl. 260—452)

This invention relates to the treatmtnt of mixtures of organic compounds and relates more particularly to a novel process for the treatment of mixtures of organic compounds containing esters whereby said esters may be hydrolyzed.

An object of this invention is the provision of a process for the catalytic hydrolysis of organic esters.

Another object of this invention is to provide a process for the hydrolysis of the esters present in a mixture of organic compounds whereby the hydrolysis step may be carried out in a continuous manner.

Other objects of this invention will appear from the following detailed description.

In many industrial operations involving the production of organic chemicals mixtures of organic compounds are encountered which normally require various treatments so that they may be separated into the several components present. Among such mixtures are those formed in the production of acetic acid by hydrocarbon oxidation processes. In addition to the acetic acid, which is a major component, the product mixtures obtained also contain various other compounds including esters. Since many of the esters represent combined acetic acid, it is important that these acetic acid values be recovered. To free the acetic acid which is combined in ester form requires a hydrolysis of the esters whereby the latter are split by chemical action into a mixture of the alcohol and the acid from which the esters are formed. Ordinarily, the hydrolysis of esters requires the use of mineral acid catalysts.

We have now found that the hydrolysis of the esters present in mixtures of organic compounds may be effected efficiently and in a continuous manner by passing the mixture of organic compounds which is to be treated over an ion exchange resin having a pH of from 2 to 3 while the mixture is heated to a temperature of 77 to 500° F. Advantageously, the mixture is diluted with sufficient water to provide the necessary hydrogen and hydroxyl ions for the hydrolysis reaction. An excess of water is even more advantageous since it shifts the reaction equilibrium toward increased hydrolysis. By controlling the rate of flow so that the liquid is in contact with the acidic ion exchange resin for from 5 to 60 minutes, over 60% of the acetic and formic acid esters present are hydrolyzed in but a single pass through the catalyst bed. Further hydrolysis of the acetic acid esters may be effected by recycling the unhydrolyzed esters back to the hydrolyzer after removal of the free formic acid, acetic acid and alcohols produced by the initial hydrolysis. Our novel process is particularly valuable for the hydrolysis of aliphatic acid esters.

The ion-exchange resins of low pH which may be employed in carrying out the novel process of our invention are the high density, nuclear sulfonic-acid type of cation-exchange resins having only one active exchange center in the resin which are commercially available in the form of attrition resistant, bead like particles and sold under the trade name "Amberlite."

In order further to illustrate the novel process of our invention, but without being limited thereto, the following example is given:

Example

A mixture of organic compounds is separated as a fraction of the oxidation product obtained during the production of acetic acid by the liquid phase oxidation of butane and consists essentially of acetaldehyde, propionaldehyde, methyl formate, ethyl acetate, ethyl formate, methyl ethyl ketone, methyl acetate, methanol, acetone and tertiary butyl alcohol, propylene oxide and methyl propionate. The mixture is subjected to a preliminary distillation so as to remove the acetaldehyde and methyl formate from the mixture. The acetaldehyde is separated so that it may be further oxidized while the methyl formate is separated to reduce the amount of free formic acid produced during the subsequent hydrolysis. A second distillation is carried out in order to separate a higher boiling fraction consisting of ethyl acetate, methyl ethyl ketone, water, methyl alcohol and methyl propionate. These compounds are separated so that they may be recycled to the oxidation unit since the further oxidation of each mol of ethyl acetate, for example, yields two mols of acetic acid. The central fraction which remains, consisting essentially of a mixture of from 45 to 60% by weight of methyl acetate, 1 to 2% by weight of ethyl formate, 1 to 2% by weight of propionaldehyde, 4 to 7% by weight of methanol, 29 to 38% by weight of acetone and 1 to 5% by weight of water is then diluted with an additional amount of water in a ratio of one part by weight of the mixture to 1 to 2 parts by weight of water. The mixture thus obtained is heated to a temperature of 140° F. and it is then passed through a hydrolysis reactor filled with particles of a cation exchange resin having a pH of 2 to 3 of the type described above. The hydrolysis reactor comprises a suitable vessel provided with an inlet through which the mixture to be treated may be introduced and an outlet for discharging the treated mixture. The rate of flow of the mixture is adjusted so that it is in contact with the catalyst for about 30 minutes. As a result of this treatment, the ethyl formate present in the mixture is found to be almost completely hydrolyzed to ethanol and formic acid, while 62% of the methyl acetate is found to be hydrolyzed to a mixture of methanol and acetic acid. By suitable distillation operations, the acetic and formic acid in the hydrolysis product may be separated from the alcohols, unreacted methyl acetate and other organic components of the mixture and the methyl acetate then recycled back to the hydrolysis reactor for further treatment. The methyl acetate is preferably recovered from the mixture, which remains after removal of the formic and acetic acid, by subjecting said mixture to a water extractive distillation.

It is to be understood that the foregoing detailed description is given merely by way of illustration and that many variations may be made therein without departing from the spirit of our invention.

Having described our invention, what we desire to secure by Letters Patent is:

1. Process for the catalytic hydrolysis of the esters in a mixture of organic compounds including aldehydes, esters, alcohols and ketones, which comprises adding an excess of water to said mixture and passing the mixture over an hydrolysis catalyst comprising a high density, nuclear sulfonic-acid type cation-exchange resin having only one active exchange center in the resin and having a pH of 2 to 3 while maintaining the mixture at a temperature of 77 to 500° F. and in contact with the catalyst for from 5 to 60 minutes.

2. Process for the catalytic hydrolysis of the esters in a mixture of organic compounds including aldehydes, esters, alcohols and ketones, which comprises adding water to said mixture in an amount of from 1 to 2 parts by weight for each part by weight of said mixture and passing the mixture over an hydrolysis catalyst comprising a high density, nuclear sulfonic-acid type cation-exchange resin having only one active exchange center in the resin and having a pH of 2 to 3 while maintaining the mixture at a temperature of 77 to 500° F. and in contact with the catalyst for from 5 to 60 minutes.

3. Process for the catalytic hydrolysis of the esters in a mixture of organic compounds containing 45 to 60% by weight of methyl acetate, 1 to 2% by weight of ethyl formate, 1 to 2% by weight of propionaldehyde, 4 to 7% by weight of methanol, 29 to 38% by weight of acetone and the remainder water, which comprises diluting the mixture with an additional amount of water in a ratio of 1 to 2 parts by weight of water for each part by weight of the mixture and passing the mixture over an hydrolysis catalyst comprising a high density, nuclear sulfonic-acid type cation-exchange resin having only one active exchange center in the resin and having a pH of 2 to 3 while maintaining the mixture at a temperature of 77 to 500° F. and in contact with the catalyst for from 5 to 60 minutes.

4. Process for the catalytic hydrolysis of the esters in a mixture of organic compounds containing 45 to 60% by weight of methyl acetate, 1 to 2% by weight of ethyl formate, 1 to 2% by weight of propionaldehyde, 4 to 7% by weight of methanol, 29 to 38% by weight of acetone and the remainder water, which comprises diluting the mixture with an additional amount of water in a ratio of 1 to 2 parts by weight of water for each part by weight of the mixture and passing the mixture over an hydrolysis catalyst comprising a high density, nuclear sulfonic-acid type cation-exchange resin having only one active exchange center in the resin and having a pH of 2 to 3 while maintaining the mixture at a temperature of 77 to 500° F. and in contact with the catalyst for from 5 to 60 minutes and then separating the free formic and acetic acid from the hydrolysis product.

References Cited in the file of this patent

Thomas et al., "Nature" 159, p. 372 (March 15, 1947).

Haskell et al., J. A. C. S., vol. 71, pp. 1284 to 1288 (1949).

Nachod: "Ion Exchange" (1949), Academic Press Inc., New York, N. Y. (pp. 269–270).

Davies et al.: "Chem. Soc. Journal" (May 1952), pp. 1607–10.